United States Patent [19]

Bradbury et al.

[11] Patent Number: 4,929,818

[45] Date of Patent: May 29, 1990

[54] METHOD AND APPARATUS FOR VENDING A CONTAINERIZED PRODUCT ON MULTIPLE OCCASIONS FOLLOWING AT LEAST ONE REFILL OF THE CONTAINER WITH THE PRODUCT

[75] Inventors: Harold M. Bradbury; Dwight B. Pfenning, both of Norman; William R. Corlett, Afton; Roscoe Mays, Jr., Edmond, all of Okla.

[73] Assignee: Rainbarrel Corporation, Afton, Okla.

[21] Appl. No.: 271,900

[22] Filed: Nov. 15, 1988

[51] Int. Cl.[5] .............................................. G06F 15/24
[52] U.S. Cl. .................................... 235/381; 235/383; 235/385
[58] Field of Search ........................ 235/381, 383, 385

[56] References Cited

U.S. PATENT DOCUMENTS

| | | | |
|---|---|---|---|
| 3,007,462 | 2/1977 | Wetzel, Jr. ............................. | 346/1 |
| 3,711,683 | 1/1973 | Hamisch, Sr. ...................... | 235/61.12 |
| 4,180,204 | 12/1979 | Koenig et al. ....................... | 235/385 |
| 4,839,505 | 6/1989 | Bradt et al. ......................... | 235/381 |

*Primary Examiner*—Harold J. Pitts
*Attorney, Agent, or Firm*—Laney, Dougherty, Hessin & Beavers

[57] ABSTRACT

A method of vending a containerized product using multiple fillings of the same container. The method includes the steps of placing machine-readable indicia on the container indicative of the price charged for both the container and the product contained therein, and at the time of placement of said indicia, or subsequently to such placement, including at a location adjacent said indicia, a stimulus-responsive machine-readable indicator capable of responding to a stimulus to undergo a change of state which is readable, conjunctively with said indicia, by a machine, to indicate a price to be charged solely for the product in the refilled container. After initial vending of the container and the product, the container is refilled with product at least once, while concurrently, during each such refilling, stimulating said indicator to cause it to undergo said change, whereby the customer buying a refill of product is charged, on the basis of the subsequent machine reading, only for such product as is placed in the container during the refilling thereof.

16 Claims, 3 Drawing Sheets

METHOD AND APPARATUS FOR VENDING A CONTAINERIZED PRODUCT ON MULTIPLE OCCASIONS FOLLOWING AT LEAST ONE REFILL OF THE CONTAINER WITH THE PRODUCT

FIELD OF THE INVENTION

This invention relates to methods of vending containerized product in a way which facilitates the sale of product constituting refillings of the same container, and entailing charging of a purchaser only for the product, and not for the container.

BACKGROUND OF THE INVENTION

Brief Description of the Prior Art

The electronic reading of product bar codes and the like for purposes of product identification, inventory control and pricing is now utilized in almost all major supermarkets and other merchandising facilities. On occasion, it is desirable to change the product bar code on a particular container in some way. For example, according to U.S. Pat. No. 4,180,284, it is desirable to make a change in the label at the time that a bar code is being read during the inventorying of a particular product. This change of the label is accomplished by the use of an ultraviolet sensitive dye material which undergoes a color change upon being exposed to ultraviolet radiation. A flasher is provided and operates synchronously with the bar code electronic reader to develop and propogate ultraviolet radiation and thus change the color of the dye. In this way, the label on the bottle is marked, as it passes by the electronic scanner normally used to read the bar code, so that that particular bottle carrying that label will thereafter be recognizable as one which has passed through the scanning station previously. This is an important aspect of the inventory control procedure described in this patent.

U.S. Pat. No. 4,007,462 proposes to change the character of the bar code by changing the light emitting properties in selected areas of the bar code. This is accomplished as a result of selective localized radiation with heat or light, and can be used for price change purposes or the like. This procedure is also advocated for use in placing alphanumeric or bar encoded information on a document so that the information can be subsequently detected by an optical reader.

U.S. Pat. No. 3,711,683 envisions changing the bar code on a container by the use of an overlay so that re-price marking can be accomplished when the bar code is thus changed.

None of the systems disclosed in the mentioned patents contemplates a control method which facilitates the refilling of a container on multiple occasions, with the customer paying for the container only on the first sale occasion, which control method contemplates subjecting the container to a machine which can read a bar code or other indicia on the label on the container label (i.e., the first sale). It is desirable that a system be provided which, without the checker, cashier or clerk being required to question the customer, or in some other awkward or difficult way, checking the fact of the refill, can use the electronic scanner normally used to read the bar code to make the proper evaluation of the transaction as being an original container-plus product transaction, or, in the alternative, a subsequent refill product-only transaction.

Brief Description of the Present Invention

This invention relates to a method for vending a containerized product using multiple fillings of the same container with product in a way which, according to the method, enables machine-readable bar codes to be employed on successive occasions to prevent payment for the container utilized at any time except at the time of the first sale. Apparatus is provided to facilitate the practice of the method in the case of a widely vended liquid product which especially lends itself to refilling of the same container as that in which it is initially purchased.

Broadly described, the method of the invention comprises initially vending a containerized product in which the container employed carries machine-readable indicia, such as a bar code, which can be sensed by an appropriate machine to indicate the price which is to be charged for both the container and the product therein. The container and product lend themselves to reutilization of the container after the product has been expended, so as to receive, by refilling, a new supply of product.

In a subsequent step of the method, a stimulus responsive machine-readable indicator, which has been placed on the container adjacent the machine-readable indicia at the time of, or subsequently to, the manufacture of the container, is stimulated by an appropriate energy source to cause the indicator to undergo a change of state. The fact of this change of state is subsequently readable or discernible by the same machine which reads the indicium carried by the container. The discernment of the changed state of the indicator, concurrently with the reading of the original indicia serves to indicate to the machine and to the price-indicating readout actuated by the machine, the fact that the container is a re-used container which contains a refill of product. This, of course, means that the container has previously been paid for, and that the price which should be charged is the price for the refill product which is placed in the container. The stimulus, in the form of an appropriate energy source which causes the indicator to undergo the described change of state, preferably acts upon the indicator concurrently with the refilling of the container, and such energy source can be caused to commence acting upon the indicator at the same time that the container undergoes refilling.

In a preferred embodiment of the invention, the empty container is initially provided to the customer prior to the time that the product is first sold in the container. The container is then filled by the customer with an initial filling of product. During such initial filling of the container, a stimulus responsive indicator carried on the container is subjected to a stimulus which causes this first indicator to undergo a change of state. The fact that this first indicator has been sensitized and has responded by changing state can be detected by a detector device located at any station where the filling of the container, as well as the subsequent refilling, takes place. At this time, the machine-readable indicia which is usually provided on the container at the time of its manufacture, along with the first indicator and a second indicator, function to allow the price of both the container and the product placed therein to be read by the scanning machine at a checkout counter, or other locus where the product and container are to be paid for.

After the sale and after the product in the container has been consumed or utilized, the customer can then, for the purpose of obtaining a refill, return to the same location where the container was first filled, or to a similar refilling station at another location, such as a different store which vends the same product. At this time, when the container is placed in a position to be automatically refilled, the first indicator is sensed by the dispensing device at the refill station, and it is determined from such reading that the container has been filled at least once previously. Once this is detected by the sensing device at the refilling station, a second stimulus source is energized and effectively stimulates a second indicator carried adjacent the machine-readable indicia, which may, for example, be a product bar code. This causes the second indicator to undergo a change of state which is readable by the same machine as that which reads the indicia. This occurs concurrently with the refilling of the container. The effect of this energization of the second indicator is to produce in the area of the machine-readable indicia, the indicia plus the changed second indicator, so that when the container is passed over the wand or reader of the bar code reading machine, the reading machine will discern that refilled product is being sold, and the price which is read will therefore be the price of the product alone, and not the container. The customer is thus fairly charged only one time for the container, and subsequently can refill the container any number of times and each time be charged only for the product.

An important object of the present invention is to provide a method of vending a containerized product in an equitable way which permits the customer to be charged once for the price of a refillable container, and subsequently charged only for the refilled product, with all of this accountability being automatically accomplished by machine.

Another object of the invention is to encourage customers to buy a particular product because of the economy of re-utilizing the same container to buy additional quantities of the product in the future through refilling of the container. A savings is effected by the fact that the entity selling the product charges the customer only one time for the container, and the remaining times only for the product placed in the container. This is accomplished with minimum trouble and minimum time delay and minimum expense to the vendor and to the customer.

Another object of the invention is to provide a simple, highly reliable system for dispensing a product, preferably a liquid, while concurrently changing certain indicia or indicators placed on the container at the time of labeling, so that subsequent refilling of the container accomplishes a change in the indicia which will enable a reading machine to accurately know, from reading of the changed indicium, that a charge should be made only for the product in the container, and not for the container which has been refilled.

In addition to the described objects and advantages of the invention, other objects and advantages will become apparent as the following detailed description of certain preferred embodiments of the invention is read in conjunction with the accompanying drawings which illustrate a part of a system which can be effectively utilized for practicing the method of the invention.

DETAILED DESCRIPTION OF CERTAIN PREFERRED EMBODIMENTS OF THE INVENTION

As society becomes more conscious of the need for conservation of resources and materials, the re-utilization of many items, including product containers, rather than the discard of such items will be demanded. There is already a practice, in the case of the vending of some products, to permit the customer to return certain types of containerization for refilling. Where a container, once used to contain original product packaged at the factory, is subsequently re-utilized to contain additional, refilled product, it is equitable to then change the total price charged so that the consumer does not pay, on the second purchase, for his container. The container has, of course, already been paid for at the first time through the check station.

By placing a stimulus-responsive indicator adjacent the bar code indicia, and providing an appropriate stimulus at the site where the filling of the container is to take place, both refilling, and a change of the total indicium can be accomplished concurrently. There is thus no inordinate delay to the customer, but he is enabled to hand to the checker, cashier or other money-receiving person acting on behalf of the vendor, a container full of product marked in such a way that the customer will only be charged for the product, and not for the container. Concurrently, the indicia on the container is machine-read to indicate that a change in the product inventory has occurred by a sale of the amount of product used in refilling the container.

In an especially useful embodiment of the invention, the clean sterilized container is provided in an empty status at a supermaket or other location where there is a machine provided for dispensing product into that container at the time the container is first used and product is first to be sold. In such circumstance, another stimulus responsive indicator is placed on the container and it may be the same as, or different in character from, the first stimulus responsive indicator. At the filling station where the container is placed under a filling spigot and within a shield or hood, proper placement of the container actuates the stimulus which causes a change in the second indicator. This occurs concurrently with the filling of the container. When this has been accomplished and the container filled, indicium which was on the label at the outset, still, as in the case of a sealed container containing the product, indicates the type of product which is being bought, and the price of both that product and the container.

After the customer has used all of the product in the container and upon the next trip to the supermarket or other vending locus, the customer can refill the container with an additional amount of the product to be purchased. At this time, a sensing device provided at the filling station senses the fact that the second indicator has undergone a change as a result of the stimulus acting thereon when the container was first filled. The sensing of the fact of this change in this second indicator then energizes or actuates either the same or a different stimulus. This stimulus then stimulates the first indicator which is located adjacent the machine-readable indicium, and the change effected by subjecting this indicator to such stimulus causes a change in the total indicia perceived by the machine as it reads both the indicia and the changed first indicator. The result is that the machine indicates, as a result of its reading, that a charge is to be made for the product, but not for the container.

Once the described change in the indicia as a result of a change in the first indicator is effected, any subsequent uses of the container for refilling with product at the point of sale will not effect any change in the container, or its labeling, for the reason that the label has, in fact, already been changed to indicate that all subsequent sales of product in that particular container involve product which has been refilled into the container, and that the container has already been paid for on an earlier occasion.

In one particular or specific embodiment of the method of the invention where it is practiced so as to enable the customer to fill the container at the outset with the first quantity of product to be purchased in that container, a single indicator is placed adjacent the label-containing machine-readable indicia. This single indicator is change-responsive after a timed exposure to a stimulus. It therefore does not undergo a change which is perceptible by the machine which reads the indicia until that particular time of exposure to the stimulus has elapsed, and the indicator has therefore been machine-perceptibily changed. Where this technique is used, a single, repeatedly acting stimulus is provided at the filling station.

At the time of the initial filling, the stimulus does not act on the indicator over a sufficient period of time to effect the described change in the indicator. Therefore, the electronic scanning machine reads the indicia and signals that a charge is to be made for both the container and the product. After the first filling, however, the additive or cumulative time of the exposure of the indicator to the stimulus is sufficiently long that the change needed to indicate a refilled status occurs in the indicator. Therefore, when the container and product are passed through the check stand or by the cashier, or clerk, the scanning machine now reads the fact that the indicator has been changed, and the overall indicia has concurrently been changed, so that only the product is to be charged to the customer, and not the container.

The drawings which are herewith provided exemplify one structure which may be utilized to effect filling of the container, and stimulation of a change in the labeling on the container.

It will be understood from the foregoing discussion, and even more clearly perceived after reading the ensuing description of the drawings, that various forms and combinations of apparatus can be utilized to carry out the steps of the method of the invention. The particular system here shown is one which has been found to be particularly suitable in operation, and constitutes a preferred embodiment of the apparatus constructed in accordance with the present invention, and for the purpose of carrying out the described method.

Figure 1:
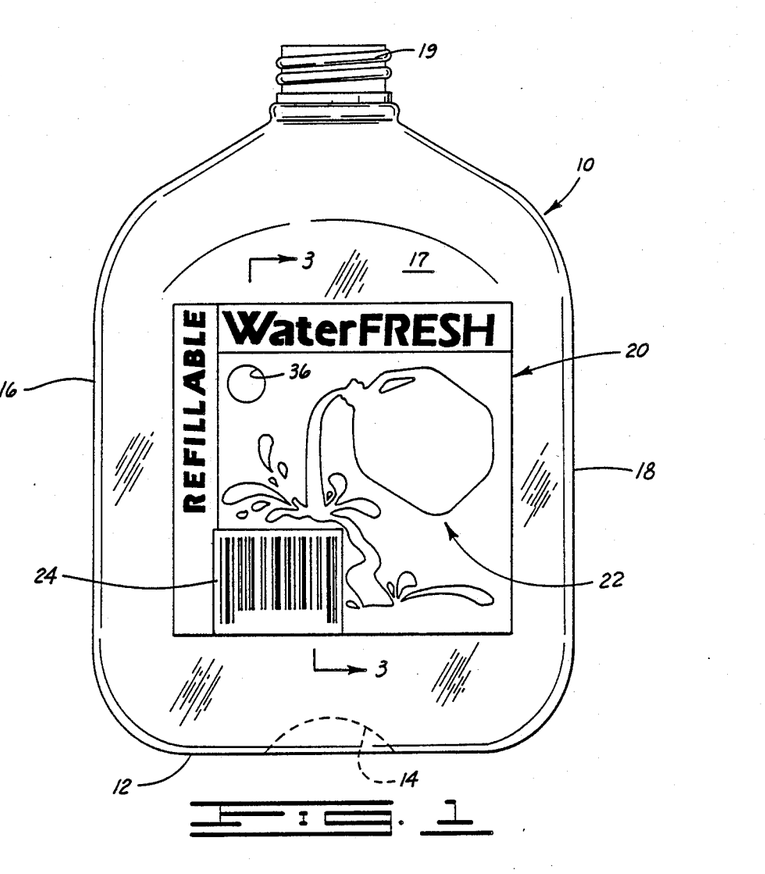
FIG. 1 is a side elevation view of a typical container utilized for containing a liquid product which is to be sold. The container carries a bar code label to enable a bar code reading machine to discern the price of the product and container, or of the product alone, depending upon the stage of progression of the method of the present invention.
Figure 5:
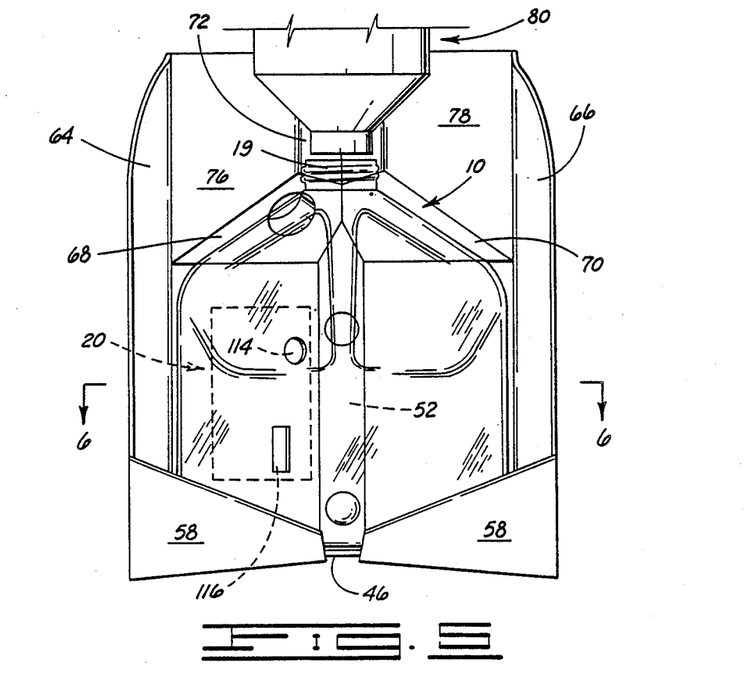
FIG. 5 is a view similar to FIG. 4, but depicting a container of the type shown in FIG. 1 positioned within the open sided housing at the filling station, and properly oriented to subject certain indicia carried on the container to status-changing radiation originating at radiation sources on the side of the housing.
Figure 6:
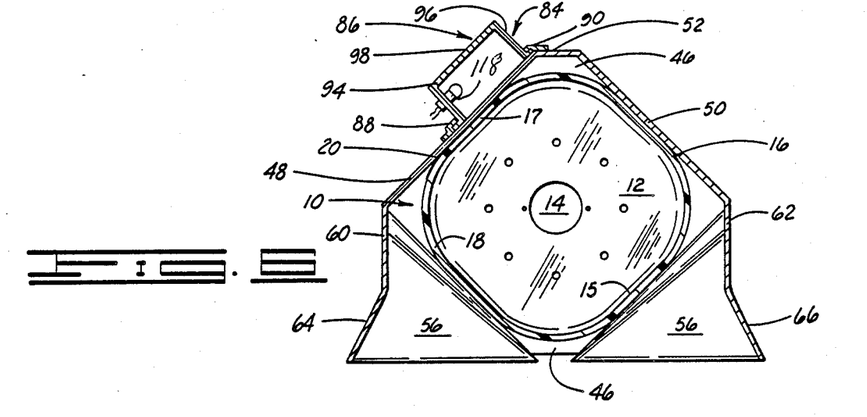
FIG. 6 is a sectional view taken along line 6—6 of FIG. 5 and depicting a part of the bottom of the housing and the lower portion of the container which is positioned in the housing to undergo filling and concurrent radiation of indicia carried thereon.

In FIGS. 1, 5 and 6 of the drawings, a typical clear plastic container 10 suitable for containing fresh mineral water, for example, is illustrated. The container could also, of course, be glass or any other suitable material. The container 10 includes a base 12 which has a central, upwardly extending indentation or recess 14 formed in the base, and vertically extending side walls 15, 16, 17 and 18 which, in the illustrated form of the container, collectively form a substantially square cross-sectional configuration as shown in FIG. 6. At its upper end, the container has an upwardly projecting cylindrical neck 19 which may be constructed to receive a friction cap, or may, as shown, carry an external thread to receive a cap threaded on to the neck for sealing the contents of the container against contamination or leakage.

Figure 2:
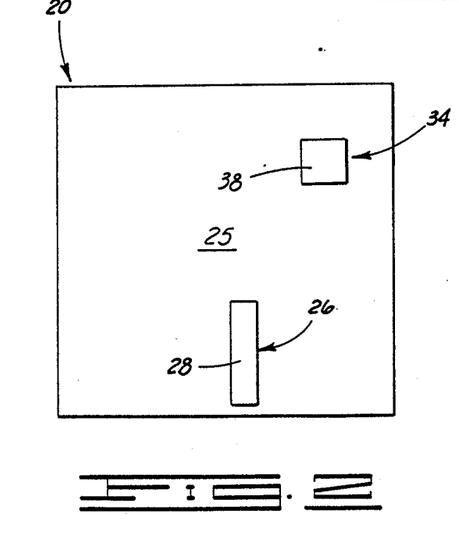
FIG. 2 is a view in elevation of the rear side of a label employed on the container depicted in FIG. 1, showing that side of the label which would be adhered to the surface of the container.
Figure 3:
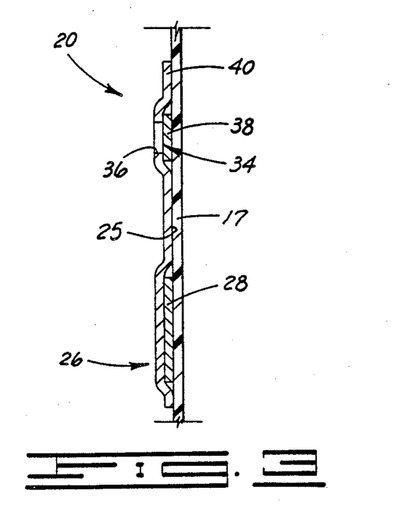
FIG. 3 is a sectional view taken along line 3—3 of FIG. 2.

Secured to one side wall 17 of the container 10 is a label, designated generally by reference numeral 20. The typical label which is shown in FIGS. 2 and 3 is constituted by a substantially square sheet or plate of plastic or paper. The label 20 carries certain advertising material 22, including the trademark of the product, which in the example illustrated is "WaterFresh", and the label further indicates that the container is refillable. The label 20 carries a product bar code 24 which is located in a position of exposure such that it can be read by an electronic scanning system of the type currently installed at the checkout stations in most supermarkets, and the like. The product bar code 24, as is well known, includes a series of straight lines or bars which are usually alternating black and white sections or zones which are indicative to the electronic scanner or machine which reads the bar code, of the price of the product, what the product is, and perhaps other information, such as the amount of the product in the container.

In addition to its exposed front or outer side which carries the advertising material 22 and bar code 24, the label 20 has an inner or back side 25 which is adhered to the side wall 17 of the container 10. At a position behind the bar code 24 on the back side 25 of the label, so as to provide a vertically extending zone which is positioned over and behind at least two of the clear spaces between black bars, a stimulus-sensitive indicator is located and is designated generally by reference numeral 26. In the illustrated embodiment of the invention, the indicator 26 is a heat sensitive material in the form of a broad bar or band 28. In the course of the practice of the method of the invention, the indicator 26 is exposed to radiant heat through at least two or more clear or transparent slots in the bar code printing on the label 20. When the heat sensitive material 28 is subjected to thermal radiation and reaches an elevated temperature of about 140° F. it will undergo a change in color from a white, or clear color, to a darkened or black color.

The effect, therefore, of subjecting the material 28 of the indicator 26 to a high temperature stimulus is to change the material to a black or dark color. This results in additional black stripes or bars appearing in the bar code. The information communicated to the electronic scanner by the bar code indicia is thus changed in a manner and for a purpose hereinafter described, after the heat sensitive material 28 has been sensitized to cause it to undergo a change of the type described.

In addition to the first-described indicator 26 which is located adjacent the bar code indicia, a second indicator, denominated generally by reference numeral 34, is secured to the rear side 25 of the label 20 so as to place a stimulus-sensitive material 38 adjacent and immediately behind an opening 36 formed through the label at the location illustrated in FIGS. 1 and 2. This stimulus-sensitive material 38 can also be a heat sensitive substance of the same type as that to which reference has already been made. Such heat sensitive material 38 (see FIG. 3) may be retained on the back side of the paper or plastic label 20 at the described illustrated location by any suitable means.

Figure 4:
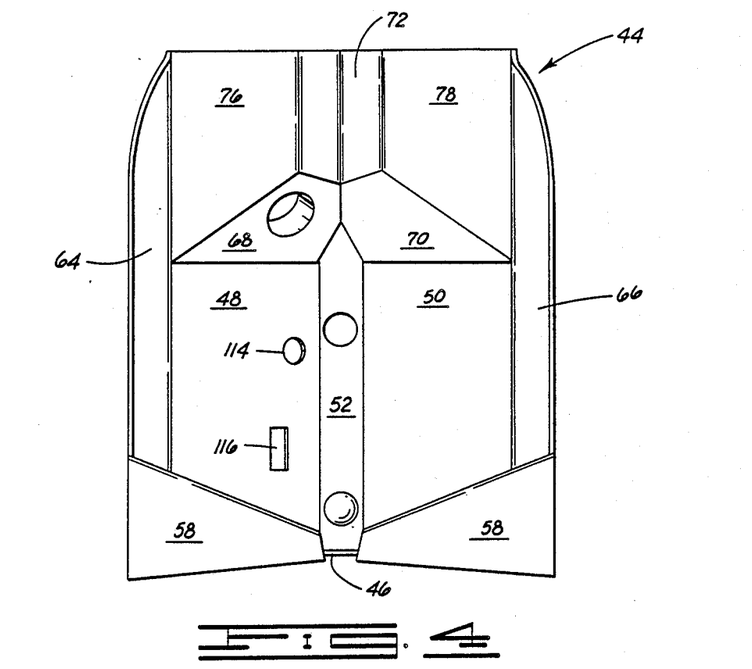
FIG. 4 is a front elevation view of a liquid product filling station which is utilized to facilitate the filling of the container depicted in FIG. 1, and which is provided with devices on the side of the filling station housing for providing indicia-changing radiation and photocells or other sensing devices.

A portion of a container filling station which is constructed to permit the indicators carried on the container to be exposed to condition-changing stimuli is depicted in FIG. 4. The filling station includes a container receiving and positioning housing, designated generally by reference numeral 44. The housing 44 can be constructed of any suitable material, such as plastic or sheet metal. In the illustrated embodiment, it is shown as constructed of relatively thin gauge sheet metal.

The housing 44 includes a centrally apertured base plate 46 which is of generally rectangular configuration as shown in FIG. 6. The base plate 46 intersects, and is joined at two of its edges, to a pair of upwardly extending side walls 48 and 50. These project substantially normal to each other and to the base plate 46, and are interconnected by a relatively short, relatively narrow vertically extending rear wall 52.

The bottom plate 46 and the side walls 48 and 50 are collectively dimensioned to register with, and closely interfit upon, the side walls and the bottom of the container 10. Therefore, when the container 10 is properly positioned within the housing 44, each container will always occupy substantially the same position. Moreover, the label 20 carried thereon will always be in substantially the same position which is that which is illustrated in FIG. 6 of the drawings. From this drawing, it will be perceived that the label 20 is relatively closely adjacent or even bears against the vertically extending side wall 48 of the housing 44. This repeatable, precise positioning of the label 20 is important for reasons which will be hereinafter described.

Figure 7:
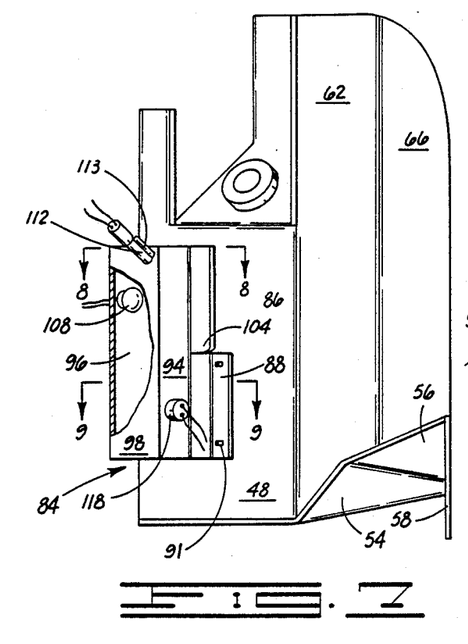
FIG. 7 is a side elevation view of the outer side of the housing used to hold the container during its filling or refilling, and during the radiation of changeable indicia thereon.

The housing 44 further includes a pair of relatively short, vertically extending side walls 54 (the external surface of one of these is shown in FIG. 7). These vertically extending side walls 54 project upwardly and perpendicularly to the remaining two lateral edges of the bottom plate 46, and are generally trapezoidal in configuration. Each of the side walls 54 is bent, at its upper edge, into a triangularly-shaped, sloping guide plate 56. At its outer edge, each guide plate 56 is bent downwardly to form a vertically extending trapezoidally-shaped front plate 58. These front plates 58 are best illustrated in FIGS. 4, 5 and 7.

Projecting forwardly from the forward vertical edges of the side walls 48 and 50 are a pair of lateral vertical walls 60 and 62. The lateral vertical walls 60 and 62 terminate in a pair of flared or divergent lead-in flanges 64 and 66. The lead-in flanges 64 and 66, along with the lateral vertical walls 60 and 62, function to guide and channel the container 10 into the seated, re-fill position. The two side walls 48 and 50 and the side walls 54 then function to place the container 10 in a precise position within the housing 44, so that the label 20 will always be at the proper position with respect to certain energy radiating devices hereinafter described.

At their upper ends, the side walls 48 and 50 intersect a pair of converging, upwardly and inwardly inclined top plates 68 and 70. The top plates 68 and 70 bear against the frustopyramidal upper side of the container 10. This further assures that the container, when placed into the position in which its bottom rests flatly against the bottom plate 46, will occupy precisely the illustrated position within the housing 44. In this position, the neck or spout 19 of the container 10 projects upwardly in alignment with a V-shaped guide recess 72 formed at the upper side of the housing 44, and positioned between a pair of opposed substantially coplanar back plates 76 and 78.

When the container 10 is in the described position, it is properly aligned for filling, and also for sensitization of those certain indicators on the container which are sensitive to an impinging energy form. This impingement of energy is effective to change the color, geometry or some other characteristic of each of the indicators to bring about a change detectable by a machine, such as the electronic scanner used for reading bar codes. In the present instance, the indicators 26 and 34 carried on the container 10, and hereinbefore described, are heat sensitive and will be changed from a clear or light color to a dark or black color when heated to a temperature of at least 140° F.

For purposes of filling the container 10 after it is positioned within the housing 44 of the filling station, a downwardly reciprocable, retractable filling spout (shown in FIG. 5), designated generally by reference numeral 80, can be utilized. The filling spout 80, terminates in an open, downwardly facing mouth which is smaller in size than the upper end of the neck or spout 18 carried on the container 10. The downwardly opening mouth of the spout 80 can be inserted into the open neck of the container 10 and thereby assure that all of the liquid product being charged to the container 10 via the spout 80 will enter the container. The filling spout 80 can be automatically lowered to its filling position after the container 10 has been positioned within the housing 44 in the manner described, or it can be lowered manually, or electrically by the pressing of an appropriate circuit-closing fill button switch at that time. The only critical aspect of this spout subassembly is that it be positionable, once the container 10 is properly placed in the housing 44, to fill the container with appropriate liquid product.

Mounted on the side wall 48 of the housing 44 is an energy source cartridge 84. The function of the energy source cartridge 84 is to provide heat sources at critical locations in order to have radiant heat impinge upon the indicators 26 and 34 carried upon the container 10 at the locations described. The cartridge 84 further carries a light source and a light sensitive device, such as a photocell, which is capable of measuring the amount of light reflected from the indicators carried on, and forming a part of, the labeling placed on the container, all in the manner and for the purposes hereinafter described.

Figure 8:
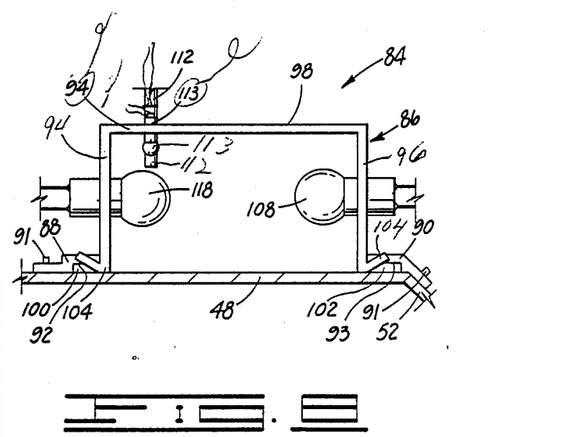
FIG. 8 is a sectional view taken along line 8—8 of FIG. 7.

The energy source cartridge 84 includes a removable sleeve, designated generally by reference numeral 86, and a pair of track plates 88 and 90. These are depicted in FIGS. 6, 7 and 8. The track plates 88 and 90 are secured by screws 91 or other suitable fasteners to the side wall 48 of the housing 44 and are angulated to provide track spaces 92 and 93 (see FIG. 9). The track spaces 92 and 93 receive out turned toe flanges of the removable sleeve 86 as subsequently described.

Figure 9:
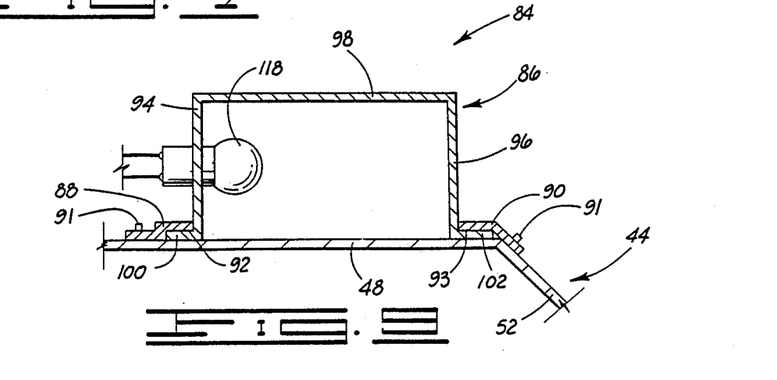
FIG. 9 is a sectional view taken along line 9—9 of FIG. 7.

The removable sleeve 86 is essentially a flanged, open sided housing, and thus includes a pair of parallel side plates 94 and 96 which extend perpendicular to the side wall 48, as shown in FIG. 9. The side plates 94 and 96 are interconnected by an outwardly spaced outer plate 98. The side plate 94 carries an outwardly extending toe or flange 100, and the side plate 96 carries an outwardly extending toe or flange 102. The removable sleeve 86 is constructed of sheet metal, and the side walls 94 and 96 can be pressed inwardly toward each other sufficiently to permit the flanges 100 and 102 to be snapped into or out of the track spaces 92 and 93 defined by the angulated track plates 88 and 90. This interfitting relationship is shown in FIG. 9. After the removable sleeve 86 is snapped into the track spaces defined between the track plates 88 and 90 and the side wall 48, it is slid downwardly until bent out portions 104 of each of the flanges 100 and 102 come to rest upon the upper edges of the track plates 88 and 90, as shown in FIG. 7.

The energy source cartridge 84 further includes a high temperature, high wattage, electrically energized bulb 108, such as a small, 100 watt quartz halogen lamp, which is mounted through an opening in the side plate 96 of the removable sleeve 86. A photocell 112 is also mounted through the outer plate 98 of the sleeve 86, as illustrated in FIG. 7, and a photocell light source bulb 113 is mounted in close proximity to the photocell.

It will be noted in referring to FIG. 4 that a first opening 114 is defined in the upper portion of the side wall 48 and a second opening 116 is defined in the lower portion of this side wall. The upper opening 114 in the upper portion of the side wall 48 is positioned opposite, and in substantially horizontal alignment with, the bulb 108 so that heat from this bulb can pass through the opening 114 and impinge upon the container 10 and upon the label 20 carried thereon. In fact, the bulb 108 is aligned through the opening 114 and through the circular opening 36 in the label 20 with the indicator 34 which is secured to the rear side 25 of the label 20 at a location between the label and the container 10. The energy sensitive indicator 34, which includes the heat sensitive material 38, is thus exposed to impingement of radiant heat from the bulb 108 at a time when the bulb is energized.

It will further be noted in referring to FIGS. 4, 6 and 7 that the photocell 112 is positioned to receive light from the light source 113 which is reflected and refracted from the heat sensitive material 38 of the indicator 34 through the opening 114 in the upper portion of the side wall 48. As will be explained, the photocell 112 thus is able to sense the change of state of the second indicator 34 from a relatively light color to a dark or blackened color after it has responded to the radiant heat directed thereagainst from the energized bulb 108. This will be better understood from the subsequent description of the operation of the apparatus in performing the method of the invention.

At a lower portion of the upwardly extending side wall 48, the opening 116 serves to admit radiant heat from a second bulb 118. The second bulb 118 is mounted in an opening formed in the lower portion of the side plate 94 of the removable sleeve 86, as shown in FIGS. 7 and 9. The relative positions of the heat generating bulb 118, the opening 116 and the stimulus-sensitive first indicator 26 (see FIGS. 2, 3, 5 and 7) are such that the radiant energy developed by the bulb 118 passes through the opening 116 and impinges upon the stimulus-sensitive material 28 in the indicator 26. This indicator is located behind the bar code 24, and the result of this radiant heating is to cause a blackening of the heat sensitive material 28 within the indicator 26, and the addition, as a consequence of such blackening, of at least two new black lines to the original bar code.

OPERATION

As has been previously explained, the method of the invention can be carried out in at least three broadly different ways. The apparatus illustrated in the figures of the drawings is capable, with slight modification, of being used for the purpose of carrying out the invention according to any of these methods.

To initially describe a preferred method of carrying out the invention, a container 10 which is empty and which is capped with a suitable removable cap is to be filled for the first time with a liquid product. This liquid product is to be placed in the container at a filling station where the housing 44 is located, such as at a supermarket. At this time, the container 10 has been fitted with a label 20 of the general type illustrated. The label has been precisely fixed to the side of the container so that it will line up with the openings and energy heat sources which characterize the construction of the housing 44 as hereinbefore described in referring to this particular exemplary embodiment. Thus, the label 20 includes a first stimulus-sensitive indicator 26, and a second stimulus-sensitive indicator 34, and these can typically be positioned as shown in the drawings. In the embodiment under discussion, and for illustrative purposes, it is assumed that both of these indicators are constructed of a heat sensitive material or pigment which undergoes a change of color from a relatively light color to a dark color upon exposure to heat. Such heat sensitive material is denominated by reference numeral 28 in the case of indicator 26, and by reference numeral 38 in the case of indicator 34.

The customer, having obtained the empty container 10, usually at the place where the product is vended, places the container in the housing 44 in the position illustrated. The flared lead-in flanges 64 and 66 and the lateral vertical walls 60 and 62 aid in locating the container 10 properly.

When the container 10 is positioned within the housing 44 in the illustrated position and status, the indicator 34 carried on the upper left portion of the label 20 (in the position shown in FIG. 1) will be aligned with the opening 114 formed in the side wall 48 so that heat emanating from the bulb 108 will impinge upon the heat sensitive material 38 in the indicator 34.

The indicator will respond to the heat by undergoing a detectable status change. As previously indicated, a preferred embodiment of the invention utilizes a heat sensitive material which undergoes a color change from light to dark or black upon reaching a temperature of 140°. It will be understood, of course, that other types of stimulus-sensitive indicators can be used, with the principal requirement being that the indicator undergo a change of state when subjected to a stimulus originating at particular locations on the housing 44 which is positioned at the filling station.

When the container 10 is placed in the housing 44, the label 20 is turned so that it is adjacent the side wall 48 and the indicators 34 and 26 are aligned with the respective openings 114 and 116 in the manner previously described. When the container 10 is properly positioned at the described location, the liquid product dispensing nozzle or spout 80, by appropriate electrical circuitry or the like, energized by a "fill" button, is caused to move down to the position illustrated in FIG. 5. Liquid product is then caused to be dispensed from the filling spout 80 into the container 10.

Concurrently with the closure of the electrical circuitry which brings the downwardly reciprocable filling spout 80 into position, light from the light source 113 is reflected from the light (undarkened) surface of the material 38 of the second indicator 34. The high level of light reflected to the photocell 112 completes and locks in an electrical circuit in which the bulb 108 is located so that this bulb is energized. The bulb 108 remains energized until filling is complete. This illumination of the bulb 108 very quickly generates a large amount of heat. This heat is radiated through the opening 36 in the label 20 so as to impinge upon the heat sensitive material 38 of the indicator 34. Prior to the impingement of the heat upon the indicator 34, the indicator is, as indicated, light colored and relatively highly light reflective. The heat causes the indicator to change to a blackened or darkened color, which change occurs during the course of the filling the container.

After the container 10 has been filled, which may be indicated by a suitable signal, either audible or visual, and the water passing through the filling spout 80 has been stopped, the filled container 10 is removed from the housing 44 and is capped. The filled container is carried to the checkout stand, or other locus where a cashier or clerk is located for the purpose of receiving payment from the customer. At this location, an electronic scanner will read the bar code 24 which has been unchanged by exposure to any stimulus prior to this time. In conventional fashion, the bar code scanner will provide an indication of the total price of both the container and the product which fills the container. It will also discern the nature or character of the product, and may indicate the amount of product in the container. The purchaser pays for both product and container at this initial filling of the container.

After the customer has used all of the product in the container 10, he can return to the supermarket or other location where the liquid product is vended, and may again place the container 10 in a housing 44 at a product filling station in order to obtain a refill of product. At this time, when the container 10 is positioned in the illustrated position within the housing 44, relatively little light from the light source 113 is reflective from the darkened material 38 of the indicator 34. The photocell 112 senses that the indicator 34 is of a dark color, which of course, has resulted from the initial filling of the container at a time when the indicator responded to the radiant heat from the bulb 108. In other words, the system at this time senses the fact that the container being filled has already been purchased by the customer, who is actually now refilling the container, and that the original or first filling caused the indicator to undergo a change of state from a light color to a dark color.

When the photocell 112 senses the darkened state of the indicator 34, it effects a change in the status of an electrical circuit such that the bulb 118 is now energized. Energization of the bulb 118 causes heat to radiate through the opening 116 in the side wall 48 of the housing 44. The radiant heat impinges upon the heat sensitive material 28 of which the indicator 26 is constructed. The radiant heat does this by passing through the label at the location along the bar code 24 where the indicator 26 is located. At this location there are two transparent or clear bars which permit the radiant heat to impinge upon the first indicator 26 which is secured to the back side of the label. The heat sensitive material 28 making up the first indicator 26 undergoes a color change from white to black in response to radiant heat impinging thereon. There are thus formed, at least two new black bars within the bar code 24. This change of state of the indicator 26 is automatically started at a time when the container is placed in its filling position within the housing 44, and the "fill" button (not shown) on the housing is started to start the refilling operation and energize the bulb 118. The completion of the irradiation of the heat sensitive material to an extent adequate to cause the change of color occurs prior to the time that filling of the container has been completed.

After filling of the container, the container is capped and is carried to the checkout stand. Here the checker, cashier or clerk will electronically read the bar code. The bar code indicia have been changed in the manner described by radiation of the first indicator heat sensitive material 28 with radiant heat. The changed bar code will indicate only the price of the product within the container, and will not assess an additional charge for the container itself because this customer has already paid for the particular container now simply being refilled with product.

It will thus be perceived that the method and apparatus of the invention have been effective to automatically change the state of the label on the container used for containing the product. A different indication is created for a container which is being employed for the first time to contain product bought for the first time, as compared to a container which is being used subsequent to the first time to contain product which has been refilled into the container. Without the checker or clerk having to understand the basis for this difference, and without the checkout person having to interrogate the customer as to whether it is a refill and accept the customer's word for this, the system automatically makes this determination in an accurate and expeditious fashion. The customer is not delayed any time beyond that which is required to refill the container, since the change of state of the bar code, when required, is automatically accomplished within the time it takes to fill the container.

The filling station at which the housing 44 is located is immediately responsive to either a new, previously unfilled container on which the indicator has not yet been changed, or also is immediately responsive to a container which has previously been filled, and is now being refilled. This is, again, because the photocell, or any other type of suitable sensing device, can "read" or determine the status of the indicator heat sensitive material (whether it is light or dark), and can thereby effect the necessary change in the status of the electrical circuitry to either energize or not energize the bulb 118.

It will be appreciated that in some instances, a factory filled container which has a sealed cap or the like closing the container may be the initial purchase by the customer. In this case, the product is not initially derived from the fill station, but is picked up by the customer from a shelf or other vending location and is carried directly to the checkout stand. The bar code, which is placed on the container label, will not have been any way changed from its original printed status. The indicator 34, however, in this event will be made a dark color so that at the time of a subsequent refill, the response of the photocell 112 will be the same as it is when the first container full of product is derived from filling up at the fill station—that is, it will indicate to the photocell that a refill is underway, and that the bulb 118 should therefore be energized to effect the described change in the bar code.

In another way of carrying out the method of the invention, the illustrated apparatus is slightly modified, as is the type of stimulus-sensitive indicator system used on the label 20. In this alternate manner of carrying out the method of the invention, the bar code 24 and stimulus-sensitive indicator 26 will be constructed in substantially the same way as has been described, and the label will otherwise be identical to that which is illustrated in the drawings and has been hereinbefore described, except that the indicator 34 will not be used on the label.

In this system, the stimulus-sensitive indicator 26 includes a material 28 which responds to a total quantity of heat or light, acting over an expanded time interval, to undergo a color change. When the container is placed in position at the fill station, so as to occupy the location shown within the housing 44, a stimulus, in the form of light or heat, is caused to direct heat or electromagnetic radiation of some type against the material 28 in the indicator 26. This material, by its nature, will not respond by undergoing a change of state until a certain period of time has elapsed. The result of this is that the indicator can be made to be partially activated, but not to the extent that a color change or other machine-readable change is brought about, at the time that it undergoes the first filling within the housing 44. When it is brought back for a refill, however, the first indicator 26 receives additional irradiation by the appropriate stimulus (light, heat, etc.), and the total time of exposure then becomes sufficient to cause a complete change in the status of the indicator so that it undergoes a color change, for example, from white to black. This, then, has effected the change in the bar code which is required to have the electronic scanner which reads the bar code determine that a refilled container is in use to contain the product, and that the customer should not be charged for the price of the container.

From the foregoing description, it will be apparent that changes and modifications in the described methods can be effected without departure from the basic principles of the invention. A great many changes can be made in the particular apparatus which has been described herein primarily for purposes of illustration, and simply to show how one type of apparatus can be used, in cooperation with certain heat sensitive indicators carried on the product container, to allow the method of the present invention to be practiced, and the objectives sought to be realized. Various changes and innovations which do effect changes of structure or methodology, but which continue to rely on the basic principles which underlie the invention, are deemed to be circumscribed by the spirit and scope of the invention, and to the end of achieving this result, and of affording a fair degree of protection to the invention, the claims are to be given a reasonably expansive interpretation and enlargement of scope beyond their narrow literal meaning.

What is claimed is:

1. The method of vending a containerized product by selling multiple fillings of the same product in the same container, the container having machine-readable indicia thereon indicative of at least the price of the product, the method comprising:

placing adjacent the indicia at the time of, or subsequently to, placement of said indicia, a stimulus-responsive machine-readable indicator capable of responding to a stimulus to undergo a change of state readable by the machine capable of reading the indicia, and readable conjunctively with said indicia to indicate a price to be charged for the product alone in the refilled container;

then, after initial vending of the container and product, refilling the container with the product at least once while concurrently, during at least the initial refill, stimulating said indicator to cause it to respond to the stimulus by undergoing said change of state, whereby the customer buying a refill of product is charged, on the basis of the subsequent machine reading, only for the product, and not for the container which is refilled.

2. The method of vending a containerized product as defined in claim 1 wherein said indicia is a bar code, including contiguous alternating light bars and dark bars, and wherein said indicator includes a stimulus-responsive material in the shape of at least one bar, and undergoing, as said change of state, a change of light reflectivity between light and dark upon stimulation by said stimulus.

3. The method of vending a containerized product as defined in claim 1 and further characterized as including the step of initially vending the container filled with product by machine-reading the indicia after said container has been marked to indicate that the product therein is the first of the product that the container has contained, and before said stimulus-responsive material is stimulated.

4. The method of vending a containerized product as defined in claim 3 and further characterized as including the step of sensing said mark concurrently with the refilling of said container, and commencing the stimulation of said indicator in response to the sensing of said mark and completing said stimulation prior to the completion of said refilling.

5. The method of vending a containerized product as defined in claim 3 wherein said stimulus-responsive material is responsive to heat to undergo said change of state.

6. The method of vending a containerized product as defined in claim 4 wherein said container is first filled with product at the same location as that at which the container is subsequently refilled, and then is marked to indicate that the product therein is the first of the product that the container has contained, and wherein said marking and indicator stimulation are automatically and consecutively effected at the time of initial filling, and at the time of at least the initial refilling, respectively.

7. A method of vending a containerized product by selling multiple fillings of the same product in the same container, such container having a product bar code thereon indicative of the total price to be paid by the purchaser for the product and for such container, said method comprising:

placing on the container at least one machine-readable stimulus responsive bar capable of undergoing a stimulus induced change of state detectable and readable by a bar code reading machine, said changed state of said stimulus responsive bar being machine-readable to indicate, with the bar code, the price alone of the product filling the container;

providing a container filling station having a stimulus source thereon for developing a stimulus capable of inducing said change of state of said bar at a selected time when said container is being filled with product by said container filling system;

providing at said container filling station, means for preventing said stimulus source from developing said change inducing stimulus at any time when said container is being filled for the first time with product by said filling system;

allowing purchasers to fill product into said container at said filling station; then machine-reading the bar code on a container filled with product to determine the price which is to be paid as a result of the sale at that time of either the product alone or the product and the container as determined by the bar code reading.

8. A method of vending a containerized product as defined in claim 7 wherein said means for preventing said stimulus source from developing said change inducing stimulus comprises a filling mechanism included in said filling station which fills the container within a time interval less than the total time required to stimulate said bar to undergo said change of state when said bar has not previously been subjected to said stimulus at the time of any prior filling of the container.

9. A method of vending a containerized product as defined in claim 7 wherein said stimulus is radiant heat, and wherein said bar is responsive to a predetermined quantity of heat capable of raising said bar to a preselected temperature.

10. A method of vending a containerized product as defined in claim 9 wherein said stimulus source is a source of radiant heat which, over a preselected time period which is longer than the time required to fill said container, radiates a quantity of heat which is sufficient to induce said change of state of said bar when said radiated quantity of heat impinges upon said bar.

11. A method of vending a containerized product as defined in claim 10 wherein said preselected time period is less than twice the amount of time which is required to fill the container with product at said filling station.

12. A method of vending a containerized product as defined in claim 11 wherein said means for preventing said stimulus source from developing said change inducing stimulus at any time said container is being filled for the first time is means for automatically filling said container within a predetermined time interval which is longer than said preselected time.

13. A system for vending a product comprising:
a re-usable container for the product;
a label on said container having a machine-readable, radiant energy-changeable bar code thereon;
a filling station for dispensing the product into the container to fill the container, said filling station including:
housing means for receiving and holding the container in a predetermined position during the filling thereof, said filling station comprising, in addition to said housing means;
a source of radiant energy positioned to irradiate said bar code when said container is received by said housing means and held in said predetermined position for filling; and
control means for controlling said source of radiant energy to energize said source of radiant energy when said container is being refilled to replace the product originally and first present in the container, and to prevent energization of said energy source when said container is being filled with the product for the first time; and
a bar code reading machine which can distinguish between said bar code before it has been subjected to radiant energy from said radiant energy source, and said bar code after it has been subjected to impingement thereupon of radiant energy originating from said energy source, whereby said bar code reading machine facilitates an identification of the price of the product where the product is refilled into said container, and the price of the container and product together where the product is the original and first product contained in said container, thereby facilitating a differentiation in price charged to the purchaser on two different occasions of purchase.

14. A system as defined in claim 13 wherein said source of radiant energy comprises a source of heat, and said bar code undergoes change upon the impingement of radiant heat thereupon.

15. A system as defined in claim 13 wherein said control means comprises:
means for causing a sensible change in said label;
means for sensing when said label has been changed by said label changing means; and
electrical circuitry controlled by said sensing means to cause energization of said radiant energy source when said sensing means senses that said label has been changed in response to said means for causing a sensible change in said label.

16. A system as defined in claim 15 wherein said means for causing a sensible change in the label is a source of thermal energy and causes darkening of a zone on the label, and wherein said means for sensing when the label has been changed comprises a photocell positioned on said housing means at a location to intercept light reflected and refracted from said zone, said photocell being connected to said electrical circuitry and controlling when said circuit is opened and when said circuit is closed.

* * * * *